US008782035B2

(12) United States Patent
Berkman et al.

(10) Patent No.: US 8,782,035 B2
(45) Date of Patent: Jul. 15, 2014

(54) SYNDICATED DATA STREAM CONTENT PROVISIONING

(75) Inventors: Omer Berkman, Tel Aviv (IL); Avinoam Rubinstain, Macabim (IL); Ori Hasse, Tel Aviv (IL); Barak Hachamov, Tel Aviv (IL)

(73) Assignee: My6sense Inc. (IL)

( * ) Notice: Subject to any disclaimer, the term of this patent is extended or adjusted under 35 U.S.C. 154(b) by 405 days.

(21) Appl. No.: 12/561,433

(22) Filed: Sep. 17, 2009

(65) Prior Publication Data

US 2011/0066613 A1    Mar. 17, 2011

(51) Int. Cl.
*G06F 7/00*     (2006.01)
*G06F 17/30*    (2006.01)

(52) U.S. Cl.
CPC .... *G06F 17/30017* (2013.01); *G06F 17/30029* (2013.01); *G06F 17/30041* (2013.01); *G06F 17/30044* (2013.01); *G06F 17/3053* (2013.01)
USPC .......... 707/723; 707/726; 707/727; 707/732; 707/733; 707/734

(58) Field of Classification Search
CPC .................... G06F 17/30017; G06F 17/30023; G06F 17/30029; G06F 17/30038; G06F 17/30041; G06F 17/30044; G06F 17/30522; G06F 17/3053; G06F 17/30699; G06F 17/30702
USPC ......... 707/722, 723, 726, 727, 732, 733, 734, 707/999.3
See application file for complete search history.

(56) References Cited

U.S. PATENT DOCUMENTS

| | | | |
|---|---|---|---|
| 7,089,194 B1 | 8/2006 | Berstis et al. | |
| 7,089,237 B2 | 8/2006 | Turnbull et al. | |
| 7,337,458 B2 | 2/2008 | Michelitsch et al. | |
| 7,345,232 B2 | 3/2008 | Toivonen et al. | |
| 7,363,282 B2 | 4/2008 | Karnawat et al. | |
| 7,783,632 B2* | 8/2010 | Richardson et al. | 707/727 |
| 8,078,632 B1* | 12/2011 | Stoutamire et al. | 707/759 |
| 2002/0052873 A1 | 5/2002 | Delgado et al. | |
| 2005/0076093 A1 | 4/2005 | Michelitsch et al. | |
| 2005/0125382 A1 | 6/2005 | Karnawat et al. | |
| 2006/0074864 A1* | 4/2006 | Naam et al. | 707/3 |
| 2007/0100836 A1 | 5/2007 | Eichstaedt et al. | |
| 2007/0260635 A1 | 11/2007 | Ramer et al. | |
| 2008/0010337 A1* | 1/2008 | Hayes et al. | 709/202 |
| 2008/0065471 A1 | 3/2008 | Reynolds et al. | |
| 2009/0132520 A1* | 5/2009 | Nemeth et al. | 707/5 |

(Continued)

OTHER PUBLICATIONS

International Search Report dated Jan. 18, 2011 in corresponding International Application No. PCT/IB2010/054116.

(Continued)

*Primary Examiner* — Hares Jami

(57) ABSTRACT

Apparatus for syndicated data stream content provisioning, the apparatus comprising: an interaction tracker, configured to track at least one interaction of a user with at least one content object of a respective one of a group consisting of at least one syndicated data stream received on a computer device, the interaction being implicitly indicative of a preference of the user, a ranking function calculator, in communication with the interaction tracker, configured to calculate a ranking function based on the tracked interaction, and a content ranker, in communication with the ranking function calculator, configured to rank a plurality of content objects of the syndicated data streams of the group, in an order based on the calculated ranking function.

38 Claims, 8 Drawing Sheets

(56) References Cited

U.S. PATENT DOCUMENTS

| | | | |
|---|---|---|---|
| 2009/0271389 A1* | 10/2009 | Chickering et al. | 707/5 |
| 2010/0050098 A1* | 2/2010 | Turner | 715/763 |
| 2010/0122174 A1* | 5/2010 | Snibbe et al. | 715/733 |
| 2010/0125570 A1* | 5/2010 | Chapelle et al. | 707/722 |

OTHER PUBLICATIONS

European Extended Search Report dated Feb. 3, 2014 in corresponding European Patent Application No. EP10816782.

* cited by examiner

Cold-play are coming to Chicago!!!
Will perform at United Center,
Chicago, IL on 23 Jul 2008.

Cold-play is an English alternative
band, formed in London, UK in 1997.
The band comprises vocalist and pianist
Chris Martin, guitarist Johnny Buckland,
bassist Guy Berryman, and drummer
Will Champion.

810

820

SYNDICATED DATA STREAM CONTENT PROVISIONING

FIELD AND BACKGROUND OF THE INVENTION

The present invention relates to content provisioning, and more particularly, but not exclusively, to a system and method for syndicated data stream content provisioning.

As the volume of data accessible via computer systems continues to increase, the need for automated tools for assisting the user to home in valuable for him information within the data also increases. Queries to search engines are routinely employed to find relevant information on the many web pages or enterprise data.

A substantial portion of consumption of digitized content gradually shifts from query-driven search in the web or enterprise digital libraries to passively following the information continuously made available though various syndicated data streams of content. The syndicated data streams include, but are not limited, to RSS (Really Simple Syndication) feeds, streams of user messages on social network platforms (say, Twitter™), Atom syndication format feeds, e-mail messages from a mail server, web site content delivered using a dedicated API (such as Facebook™ connect), etc., as known in the art.

Typically, a user subscribes to one or more syndicated data streams, such as an RSS news feed, a web feed, or a stream of user messages in a social network platform, as known in the art. Optionally, the data stream is syndicated by a content provider (say by a news network, such as CNN™), by a Web Blogger, etc. The syndicated data stream is used by the content provider, to provide users who subscribe to the syndicated data stream with a frequently updated, structured list of content objects.

A content object is a data object with a usually short textual description which may be presented to the user. The textual description may include a content item itself (say a user message published on a social network platform), a button which presents a content item to the user upon clicking on the button, a hyperlink which links the user to a page of a web site, a link which initiates downloading of the content item, etc., as known in the art.

In a typical current scenario of syndicated data stream provisioning, a content provider publishes a feed link on the provider's web site. End-users can subscribe to the feed, using an aggregator program (also called a feed reader or a news reader). The aggregator program runs on the end-users' machines. The subscription process is usually as simple as dragging the link from the web browser to the aggregator. When instructed, the aggregator asks all the servers in its feed list if they have new content. If so, the aggregator either makes a note of the new content or downloads it. Aggregators can be scheduled to check for new content periodically.

The motivation for the shift from query-driven search in the web or enterprise digital libraries to passively following the information continuously made available though various syndicated data streams is manifold. In particular, users don't want to miss information the users consider valuable and yet the interests of the users are typically wide and dynamic, and thus it is not easy to express the user's interests via standard queries.

Subscription-based information consumption from syndicated data streams, such as RSS feeds, or a user specific Twitter™ feeds of messages from Twitter™ followers of a user, provides the user with a potential of timely access to information valuable for him. However, the subscription-based information further creates an overload of data provided to the user from one or more data streams.

It is unavoidable that most pieces of information (i.e. content objects, say video clips, news reports, articles, Twitter™ short messages ("Twits"), etc.) distributed via even a single syndicated data stream (say a single RSS feed) are optimized for a specific single user.

Even if all the streams the user subscribed to are fully personal, the multitude of such streams may still create the effect of an information overload. Consequently, the user has to separate signal from noise, and browse through multitude of content objects, in an attempt to locate the content objects that are more valuable for the user. As this process is time consuming, for many users getting to the valuable content becomes virtually impossible.

Several current systems target information overload on the user and aim at reducing the burden put on the user.

For example, the Google™ Reader system allows the user to browse through content objects not only in the chronological order of creation, but also in an order reflecting the rate at which various streams the user subscribed to are updated.

FeedHub™, an mSpoke™ powered system, exploits content categorization, together with absolute, explicit feedback of a user on content objects (of the form "I like this item"), to establish a relevance ranking, which is a relative numerical estimate of the statistical likelihood that a certain content object is of interest to the user. The efficiency of this method heavily relies on the user's willingness to continuously provide explicit feedback on content objects provided to him, as well as on credibility and semantic consistency of the explicit feedback.

U.S. Pat. No. 7,089,237, to Turnbull et al., filed on December Jan. 26, 2001, discloses a search and recommendation system, which employs the preferences and profiles of individual users and groups within a community of users.

U.S. Pat. No. 7,345,232, to Toivonen, filed on Nov. 6, 2003, describes a play list selection module, which creates a play list of media pieces stored in databases accessible by the selection module. The play list includes media pieces that are adapted to a specific user together with randomly selected media pieces, in a ratio determined by a surprise factor provided by the specific user. The play list may begin with a set of media pieces that are known to be enjoyed by the specific user, say media pieces previously consumed by the specific user, and ends with the randomly selected media pieces.

U.S. patent application Ser. No. 10/727,444, to Karnawat, filed on Dec. 3, 2003, describes a personalized internet search system based on a context-based user feedback gathered regarding searches performed on a search mechanism.

U.S. patent application Ser. No. 10/861,154, to Michelitsch et al., filed on Jun. 4, 2004, describes a content recommendation device with user feedback The device described by Michelitsch includes a selection engine that selects content objects from a content object pool according to a user profile.

U.S. Pat. No. 7,089,194, to Berstis et al., filed on Jun. 17, 1999, describes a method and apparatus for adaptively targeting advertisements to a specific client computer from a server within a distributed data processing system. As a user of the client browses the internet, the material that is downloaded to the client is scanned to generate a list of keywords. The keywords are used to select an advertisement from a database, the selected advertisement is inserted into the material, and the material and selected advertisement are presented together to the user.

SUMMARY OF THE INVENTION

According to one aspect of the present invention, there is provided an apparatus for syndicated data stream content provisioning, the apparatus comprising: an interaction tracker, configured to track at least one interaction of a user with at least one content object of one of a group consisting of at least one syndicated data stream received on a computer device, the interaction being implicitly indicative of a preference of the user, a ranking function calculator, in communication with the interaction tracker, configured to calculate a ranking function based on the tracked interaction, and a content ranker, in communication with the ranking function calculator, configured to rank a plurality of content objects of the syndicated data streams of the group, in an order based on the calculated ranking function.

According to a second aspect of the present invention, there is provided a computer implemented method for syndicated data stream content provisioning, the method comprising steps the computer is programmed to perform, the steps comprising: tracking at least one interaction of a user with at least one content object of one of a group consisting of at least one syndicated data stream received on a computer device, the interaction being implicitly indicative of a preference of the user, calculating a ranking function based on the tracked interaction, and ranking a plurality of content objects of the syndicated data streams of the group, in an order based on the calculated ranking function.

According to a third aspect of the present invention there is provided Computer readable medium storing computer executable instructions for performing steps of syndicated data stream content provisioning, the steps comprising: tracking at least one interaction of a user with at least one content object of one of a group consisting of at least one syndicated data stream received on a computer device, the interaction being implicitly indicative of a preference of the user, calculating a ranking function based on the tracked interaction, and ranking a plurality of content objects of the syndicated data streams of the group, in an order based on the calculated ranking function.

According to a fourth apparatus of the present invention, there is provided an apparatus for syndicated data stream content provisioning, the apparatus comprising:

an interaction tracker, configured to track at least one interaction of a user with at least one content object of a syndicated data stream received on a computer device, the interaction being implicitly indicative of a preference of the user, a ranking function calculator, in communication with the interaction tracker, configured to calculate a ranking function based on the tracked interaction, and a content ranker, in communication with the ranking function calculator, configured to rank a plurality of content objects of syndicated data streams, in an order based on the calculated ranking function.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of the exemplary embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of exemplary embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
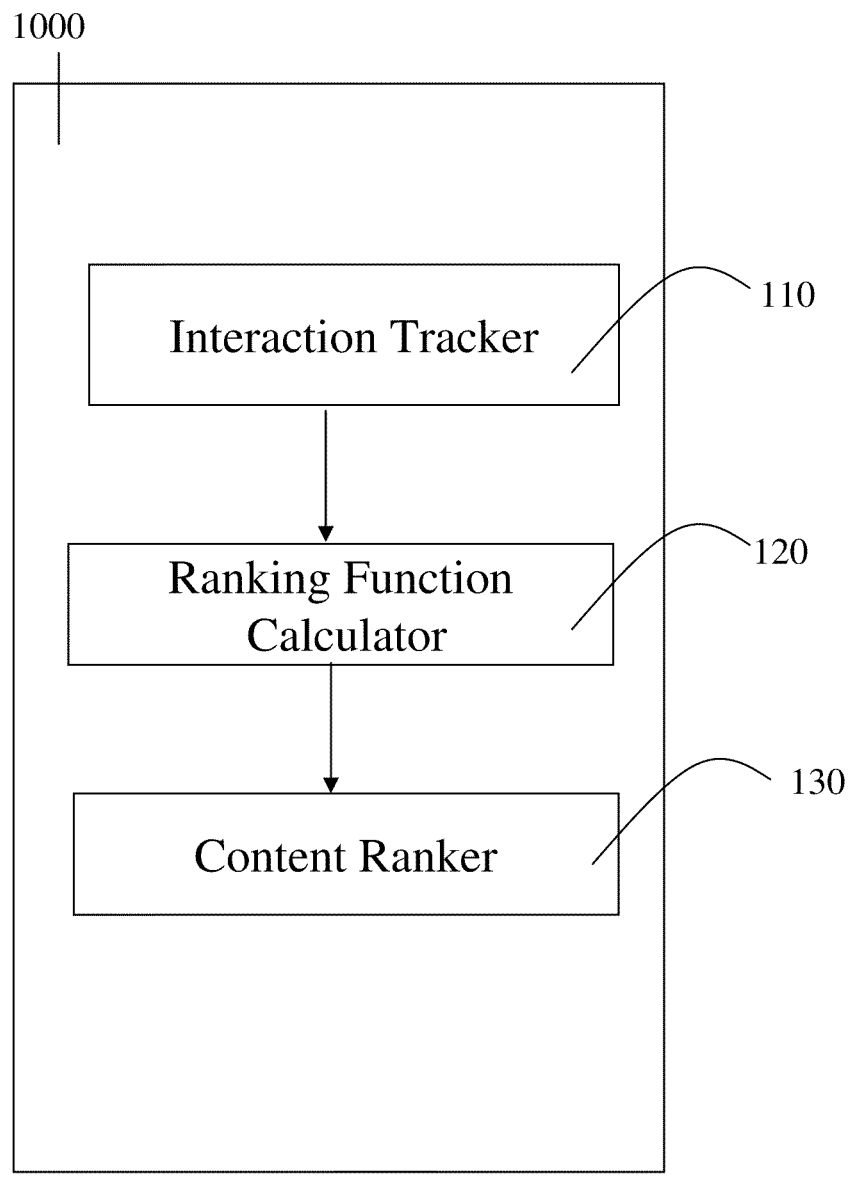
FIG. 1 is a block diagram schematically illustrating an apparatus for syndicated data stream content provisioning, according to an exemplary embodiment of the present invention.

The present embodiments comprise an apparatus and method for syndicated data stream content provisioning.

Typically, a user of a computer device (say a desktop computer, a laptop computer, or a mobile phone) subscribes to one or more syndicated data streams. The syndicated data streams may include, but are not limited to: RSS (Really Simple Syndication) feeds, a user specific Twitter™ feed of messages from Twitter™ Followers of the user, an RSS feed available in a news website, etc., as known in the art.

On the computer device, each content item (say a video clip, an article in a news website, a document the user may download from the web site, etc.) of the syndicated data streams is introduced to the user using a content object. The content object is a data object with a usually short textual description which is presented to the user. The textual description may include the content item itself, a button which presents the content to the user upon clicking on the button, a hyperlink which links the user to a page of a web site, a link which initiates downloading of the content item, etc., as known in the art.

In a method according to an exemplary embodiment of the present invention, content objects of the syndicated data streams are ranked using a ranking function. The ranking function represents preferences of the user over different features of content objects of the syndicated data streams.

The content objects of the syndicated data streams may be presented to the user in an order determined using the calculated ranking function, say as a ranked list presented to the user, using a dedicated graphical user interface, as described in further detail hereinbelow.

The ranking function is calculated using implicit feedback provided by the user, as the user interacts with content objects of syndicated data streams the user subscribes to, as described in further detail hereinbelow. For example, a user who skips a first content object, opens a second content object, or sends en email sharing the second object with a friend, implicitly provides a feedback on the user's relative preference for the second content object over the first content object.

Optionally, the ranking function is further based on circumstances of the user's interaction with the content objects, say on the time of day, geographical location, bandwidth available, model of a computer device used by the user, etc., as described in further detail hereinbelow.

Optionally, the method further helps adaptively targeting business objects, i.e. business value information to the user, based on the calculated ranking function.

For example, a user who downloads an article about a new movie (using a content object of the syndicated data stream), may be presented (using a content object) a video clip of a movie star, together with a business object which advertises a cinema ticket sales web site and has a hyperlink connecting the user to the cinema ticket sales web site.

The principles and operation of an apparatus and a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating an apparatus for syndicated data stream content provisioning, according to an exemplary embodiment of the present invention.

Apparatus 1000, for syndicated data stream content provisioning, comprises an interaction tracker 110.

The interaction tracker 110 tracks one or more interactions of a user with one or more content objects. Each of the content objects interacted with, belongs to one of a group of one or more syndicated data streams received on a computer device, as described in further detail hereinbelow.

The computer device may include, but is not limited a desktop computer, a mobile computer (such as a laptop computer or a notebook computer), a cellular phone, etc., as know in the art.

The tracked interaction is implicitly indicative of a preference of the user, as described in further detail hereinbelow.

In one example, the interaction tracker 110 tracks the user's sharing of information pertaining to a content object on a social network platform, say when the user recommends a new clip by Madonna (presented to the user using a content object) on a social network platform such as Twitter™ or Facebook™. The tracked sharing of the information is implicitly indicative of the user's preference for Madonna content in particular, and Pop Music content in general.

In a second example, the interaction tracker 110 tracks the user's sharing of information pertaining to a content object with another person, say when the user sends an email message with the content object's title to a friend.

In a third example, the interaction tracker 110 tracks the user's spending more time on a National Geographic™ article than on a financial news report.

Optionally, the interaction tracker 110 records the tracked interactions in a database of historic interactions, as described in further detail hereinbelow.

Apparatus 1000 further includes a ranking function calculator 120, in communication with the interaction tracker 110.

The ranking function calculator 120 calculates a ranking function based on the tracked interaction(s).

Optionally, the ranking function calculator 120 calculates the ranking function, using a Ranking Support Vector Machine (SVM) algorithm. For example, a traditional Ranking Support Vector Machine (SVM) algorithm, as taught by Ralph Herbrich et al., in 2000, may be applied on features of content objects the user interacts with, as described in further detail hereinbelow.

Optionally, the ranking function calculator 120 further uses data which pertains to circumstances of the tracked interaction, for calculating the ranking function. The data pertaining to the circumstances may include, but is not limited to: time of day, day of week, type of a computer device used by the user, bandwidth, geographic location (say geographical location obtained using GPS functionality on the computer device of the user), etc., as known in the art.

Optionally, the ranking function calculator 120 generates comparative data indicative of a relative preference of the user over at least two content objects subjected to the traced interactions.

For example, the ranking function calculator 120 may generate data indicating that the user prefers a title of a first content object over titles of a second content object and a third content object, as described in further detail hereinbelow.

The ranking function calculator 120 may use the generated comparative data, to calculate the ranking function.

Optionally, the ranking function calculator 120 further uses historical data of interactions of the user with content objects, for calculating the ranking function, say using a database of historical interactions of the user with content objects, as described in further detail hereinbelow.

Apparatus 1000 further includes a content ranker 130, in communication with the ranking function calculator 120.

The content ranker 130 ranks content objects of the syndicated data stream, in an order based on the calculated ranking function, as described in further detail hereinbelow.

For example, a ranking function may be calculated for a specific user whose interactions with content objects include spending more time on a content object such as a car race news sport, than on content objects having to do with pop music. The interactions indicate that the user is likely to prefer sport and car content objects over pop reports and clips by Madonna. Consequently, the content ranker 130 ranks a report on a car race in Monte-Carlo higher than a report on an NBA basketball semi-final, and the report on the NBA basketball semi-final higher than a Michael Jackson clip.

Optionally, the content ranker 130 further presents the ranked content objects to the user in the order based on the calculated ranking function, say using a dedicated graphical user interface, as described in further detail hereinbelow.

Optionally, the content ranker 130 ranks all content objects available in the syndicated data streams in a given time, and renders all the ranked content objects for presentation to the user. Alternatively, the content ranker 130 ranks all content objects available in the syndicated data streams in the given time, but renders only a number of content objects ranked highest among the ranked business objects, for presentation to the user.

Optionally, the content ranker 130 presents the ranked content objects to the user in a ranked list arranged in the order determined using the calculated ranking function, say using a dedicated graphical user interface, as described in further detail hereinbelow.

Optionally, the content ranker 130 further uses the calculated ranking function, to select one or more business objects among business objects, say business objects stored in a repository, as described in further detail hereinbelow.

Optionally, the content ranker 130 uses the calculated ranking function to select one (or more) business object(s) matching one of the ranked content objects, among business objects stored in a repository. The content ranker 130 may present the selected business objects in association with the matched content object, as described in further detail hereinbelow.

Optionally, the selected business objects categorically match one of the ranked content objects, and the content ranker 130 presents the selected business objects in association with the matched content object, as described in further detail hereinbelow.

Optionally, the content ranker 130 selects one or more keywords among a plurality of keywords characterizing one of the ranked content objects, by applying the calculated ranking function on the keywords. Then, the content ranker 130 selects one or more business objects among business objects stored in a repository, using the selected keywords.

Optionally, the content ranker 130 selects the business objects among the business objects stored in the repository, using a query based on the selected keywords, as described in further detail hereinbelow.

Optionally, the repository belongs to a third party, say a third party in communication with the content ranker 130 over the internet.

Optionally, apparatus 1000 further includes an explicit preference interface, in communication with the ranking function calculator 120, operable by the user for inputting explicit preference data. The ranking function calculator 120 uses the input explicit preference data, for calculating the ranking function.

In one example, the explicit preference interface is implemented as a graphical user interface, which allows the user to express his feeling towards a certain content object, say using a graphical radio button with two or more alternative options (say one positive, one negative, and one neutral), a check box, a text box, etc., as known in the art.

Optionally, the apparatus 1000 further includes a dedicated graphical user interface, in communication with the interaction tracker 110, as described in further detail hereinbelow.

Optionally, the dedicated graphical user interface captures data which pertains to the interaction(s), using known in the art techniques. For example, the graphical user interface may capture data of an email message. Optionally, the email message is used by the user to share a content object with a friend (say a Google™ friend, as known in the art).

Optionally, the data captured by the dedicated graphical user interface further includes data pertaining to the transaction itself, as well as data pertaining to circumstances of the interaction. For example, the data captured by the graphical user interface may include data of the interaction's hour of the day, the bandwidth available on the user's computer device, the model of the user's computer device, etc., as described in further detail hereinbelow.

The graphical user interface provides the captured data to the interaction tracker, and the interaction tracker 110 uses the captured data, for tracking the interaction(s).

Figure 2:
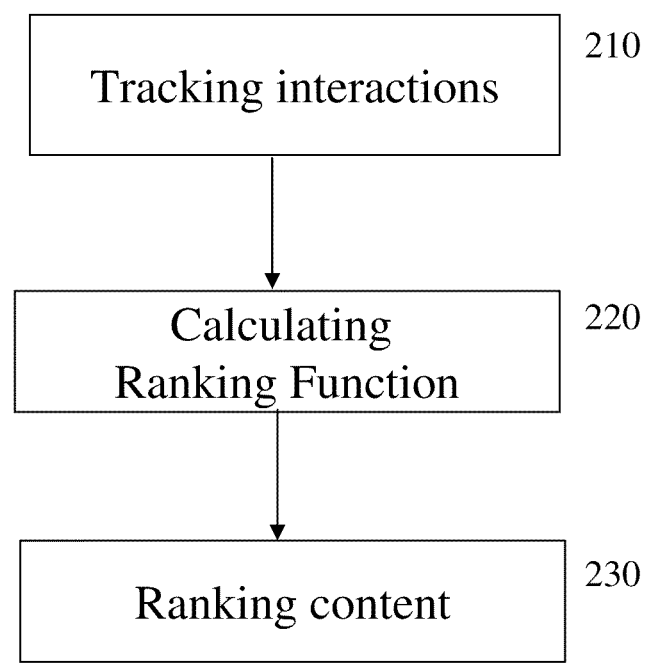
FIG. 2 is a flowchart illustrating a first method for syndicated data stream content provisioning, according to an exemplary embodiment of the present invention.

Reference is now made to FIG. 2, which is a flowchart, illustrating a first method for syndicated data stream content provisioning, according to an exemplary embodiment of the present invention.

In a method according to an exemplary embodiment of the present invention, there are tracked 210 one or more interactions of a user with one or more content objects of one or more syndicated data streams received on a computer device. Optionally, the interaction is tracked 210 by the interaction tracker 110, as described in further detail hereinabove.

The computer device may include, but is not limited a desktop computer, a mobile computer, a cellular phone, etc., as know in the art.

The tracked interaction is implicitly indicative of a preference of the user.

In one example, there is tracked 210 the user's spending more time on a National Geographic™ article of an RSS feed of the National Geographic's web site feed, than on a financial news report of a Financial Times™ RSS feed. The tracked spending of more time on the National Geographic™ article may be indicative of a preference of the user for the National Geographic™ article in particular, and content objects having to do with nature in general.

In a second example, there is tracked 210 the user's sharing of information pertaining to a content object on a social network platform, say when the user recommends a new music album, on a social network platform, as described in further detail hereinabove.

In a third example, there is tracked 210 the user's sharing of information pertaining to a content object with another person, say when the user sends an email message with the content object's title to a friend.

Optionally, the tracked interactions are recorded in a database of historic interactions, as described in further detail hereinbelow.

Next, there is calculated 220 a ranking function based on the tracked 210 interaction(s), say using the ranking function calculator 120, implementing a Ranking Support Vector Machine (SVM) algorithm, as described in further detail hereinabove.

For example, a traditional Ranking Support Vector Machine (SVM) algorithm, as taught by Ralph Herbrich et al., may be applied on features of content objects the user interacts with, as described in further detail hereinbelow.

Optionally, there is further used data pertaining to circumstances of the tracked interaction, for calculating the ranking function. The data pertaining to the circumstances may include, but is not limited to: time of day, day of week, type of a computer device used by the user, bandwidth, geographic location (say geographical location obtained using GPS functionality on the computer device of the user), etc.

Optionally, there is further generated comparative data indicative of relative preference of the user over at least two content objects subjected to the traced interactions. For example, the comparative data may indicate that the user prefers a title of a first content object over a title of a second content object. The generated comparative data may be used to calculate the ranking function, as described in further detail hereinbelow.

Optionally, there is further used historical data of interactions of the user with content objects, for calculating the ranking function, say using a database of historical interactions of the user with content objects, as described in further detail hereinbelow.

Finally, content objects of the syndicated data stream are ranked 230, in an order based on the calculated ranking function, say using the content ranker 130, as described in further detail hereinabove.

For example, a ranking function may be calculated for a specific user whose interactions with content objects include spending more time on a National Geographic™ article than on content objects having to do with pop music. The interactions indicate that the user is likely to prefer Nature and Science content objects over pop reports and clips by Madonna. Consequently, nature reports are ranked 230 higher than reports on NBA basketball semi-finals, and the reports on the NBA basketball semi-finals are ranked 230 higher than a Michael Jackson clip.

Optionally, the ranked 230 content objects are presented to the user in the order based on the calculated ranking function, say using a dedicated graphical user interface. For example, the content objects may be presented to the user in a ranked list arranged in the order determined using the calculated ranking function, as described in further detail hereinbelow.

Optionally, all content objects available in the syndicated data stream in a given time are ranked 230 and rendered for presentation to the user, say using the dedicated graphical interface. Alternatively, all content objects available in the syndicated data stream in a given time are ranked 230, but only a number of content objects ranked highest among the ranked 230 content objects, are rendered for presentation to the user.

Optionally, there is further selected one or more business objects among business objects (say business objects stored in a repository), using the ranking function, as described in further detail hereinbelow.

Optionally, there is selected one or more business objects among business objects matching one of the ranked content objects, among business objects stored in a repository. The selected business objects may presented to the user in association with the matched content object, as described in further detail hereinbelow.

Optionally, the selected business objects categorically match the ranked content object, and are presented to the user in association with the matched content object, as described in further detail hereinbelow.

Optionally, there is selected one or more keywords among a plurality of keywords characterizing one of the ranked content objects, by applying the calculated ranking function on the keywords. Then, there is selected one or more business objects among business objects stored in a repository, using the selected keywords.

Optionally, the business objects are selected among the business objects stored in the repository, using a query based on the selected keywords, as described in further detail hereinbelow.

Optionally, the repository belongs to a third party, and the query is sent to the third party, say using the internet, as known in the art.

Optionally, there is further explicit preference data received from the user, for calculating the ranking function.

For example, a graphical user interface may be used to receive explicit preference data from the user who expresses his feeling towards a certain content object, say using a graphical radio button with two or more alternative options (say one positive, one negative, and one neutral), a check box, a text box, etc., as known in the art.

Figure 3:
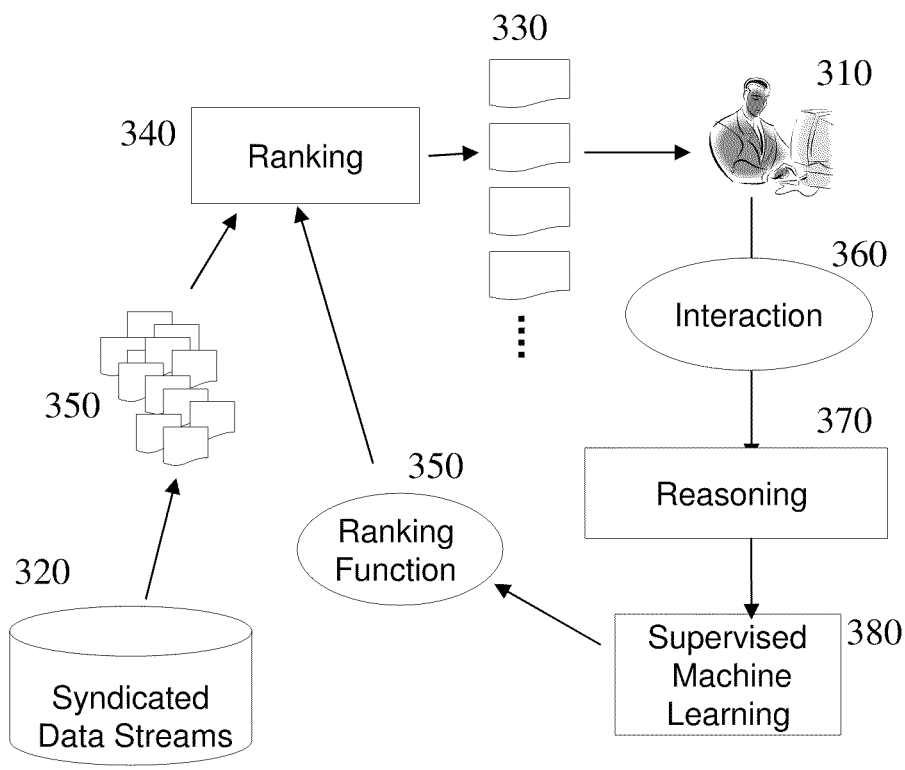
FIG. 3 is a flowchart illustrating a second method for syndicated data stream content provisioning, according to an exemplary embodiment of the present invention.

Reference is now made to FIG. 3, which is a flowchart, illustrating a second method for syndicated data stream content provisioning, according to an exemplary embodiment of the present invention.

In a second method according to an exemplary embodiment of the present invention, a user 310 of a computer device subscribes to one or more syndicated data streams.

The user 310 is connected to the syndicated data streams 320 through apparatus 1000, as described in further detail hereinabove. That is to say that the apparatus 1000 may control the presentation of content objects of the syndicated data streams 320 to the user.

A content object is a data object which refers the user to a content item such as multimedia information, a web page, an article which may be downloaded from a web site in a Portable Document Format (PDF), etc., as described in further detail hereinabove.

The content is either given directly in the description of the content object or is accessible from some open-world or enterprise information repository using an identification (say, a hyperlink), given in the description of the object, as known in the art.

The content objects may be created by the apparatus 1000 or delivered by the apparatus 1000 from a third-party source, on behalf of the user.

According to an exemplary embodiment, the ranking function calculator 120 associates each content object of the syndicated data streams 320 with a list of properties semantically characterizing the content represented by the content object. Optionally, the properties correspond to keywords present in the content (say words in a news report) or combinations of keywords present in the content, semantic categories (such as Music, Pop, etc.), authorship of the content, etc.

For example, the ranking function calculator may associate a content object representing a video clip by Madonna, available through a syndicated data stream broadcasted on an MTV™ web site, with properties such as Music, Madonna, Pop, Video, Singers, etc.

Optionally, for calculating the ranking function, the ranking function calculator 120 represents each content object as a vector in a, possibly high-dimensional, space of content-characterizing features selected by the ranking function calculator 120, to characterize content. In the following description, the content-characterizing features are denoted by F, and the space of content-characterizing features is thus of dimensionality |F|, as known in the art.

Upon a request by the user 310, the content ranker 130 presents the user 310 with a ranked list 330 of content objects, say using a dedicated graphical user interface, as described in further detail, and illustrated using FIG. 7, hereinbelow.

Typically, the ranked list 330 is a list of titles of the content objects 350, and the graphical user interface may be used by the user, to select from the list of titles, one or more content objects 350 to be browsed in further detail.

The graphical user interface may further allow other ways for the user to navigate between the content objects of the ranked list.

The content ranker 130 ranks 340 the content objects 350 according to a ranking function 350 gradually calculated for the user by the ranking function calculator 120, as described in further detail hereinabove.

For each user, the profile-based ranking may initially correspond to a default ranking. Optionally, the default ranking is based on objective information pertaining to the user (such as demographic information), as known in the art.

The ranking function calculator 120 calculates the ranking function 350 based on the user's interactions 360 with the content objects 35, as tracked by the interaction tracker 110.

For example, the ranking function calculator 120 may base the ranking function on the user's content consumption behavior, using a proper combination of which involves reasoning 370 about the user's interactions (possibly together with other actions carried out by the user and tracked by the interaction tracker 110). The combination further involves supervised machine learning 380, say using an SVM algorithm, as described in further detail hereinbelow.

The ranking function calculator 120 may calculate the ranking function 350 either online, upon the emergence of the user interactions 360, or offline, using a cache of unprocessed user interaction data, or a database of historic interactions, as described in further detail hereinabove.

In one example, the user 310 consumes only a subset of content objects 350 provided to him through the ranked list 330, and ignores all other content objects, say according to the content object's short description, which appears as a title or a snippet. By consuming only the subset, the user implicitly provides the system with a feedback on what his preferences over content objects are.

For example, suppose that the user briefly goes over the ranked list 330 (i.e. of titles of content objects) and opens (i.e. requests the full content of) a content object ranked third from the top.

The interaction of the user with the content object ranked third from the top of the ranked list 330 is interpreted as an implicit indication. The implicit indication is that under specific circumstances of the interaction 360 (such as a specific moment or the user's location), the title of the third object is of a higher interest to the user than the title of first two objects. More generally, a user interaction 360 may indicate a deviation of the user preferences over the content objects 350 presented to the user from the order in which the content objects are presented to the user in the ranked list 330.

Other interactions 360, which implicitly indicate the user's preference over content objects may include, but are not limited to: a) relative time spent while consuming a content object, b) content-related activities performed in the scope of consuming an object (such as sharing the content with other users or consuming a business object annotating a content object), or any other implicit and explicit expressions of emotional attitude towards individual content objects, as described in further detail hereinabove.

The interaction tracker 110 tracks the interactions 360 by monitoring, analyzing, and recording data of the interactions 360 (say in a dedicated database, as known in the art).

Optionally, the interaction tracker 110 further tracks information characterizing the circumstances of each of the tracked interactions 360.

The information characterizing the circumstances may include, but is not limited to: a) a type of hardware platform (i.e. computer device) the user uses for the interactions, b) the geographic location of the user (say using a GPS on the user's computer device, as known in the art), c) the time of the day when the interaction takes place, d) the amount of communication bandwidth, and d) overall connectivity and information-consumption activity of a user's client application.

Similarly to the space of content-characterizing features, the information characterizing the circumstances may be represented by the ranking function calculator 120, as a vector in a, possibly high-dimensional, space of circumstance-characterizing features selected by the ranking function calculator 120, to characterize the circumstances of the interaction.

In the description provided hereinbelow, the space of circumstance-characterizing features is denoted by C, and the induced content-characterizing feature space is thus of dimensionality |C|, as known in the art.

The ranking function calculator 120 combines the two spaces (F and C). By combining F and C, the ranking function calculator 120 represents the tracked interactions 360 implicitly indicative of the user's preferences over a couple of content objects denoted X, Y, in the circumstances of the interactions 360.

The ranking function calculator 120 combines the two spaces (F and C), by calculating the vectors x·c, y·c in the feature space which is the cross-product of the feature spaces F and C, where x, y$\in$F represent the content objects X and Y, respectively, and c$\in$C represents the circumstances, in which the user's interactions 360 with the content objects X and Y take place.

The ranking function calculator 120 uses a supervised-learning machinery to calculate 380 a user-specific ranking function 350 over content objects the user interacts with, using known in the art methods.

The ranking function 350 is a real-valued function from the cross-product of the feature spaces F and C. The ranking function calculator 120 compiles the data pertaining to the tracked interactions 360 into a set of, possibly soft, mathematical constraints applied on the ranking function 350.

For example, in reasoning 370 of the user behavior (i.e. interactions), a constraint derived from the logical conclusion that in a certain session, the user prefers a content object X over a content object Y, is compiled into a constraint that the value of the ranking function on x·c should be at least as high as the value of the ranking function value on y·c.

The ranking function calculator 120 processes the constraints using a supervised machine learning 380.

Optionally, supervised machine learning 380 uses a Ranking Support Vector Machine (SVM) algorithm 380 (say Herbrich's SVM, as taught in 2000), as known in the art. The constraints are inputted into an SVM binary classifier (as taught by Vapnik in 1972), as a pair of positive and negative examples, which comprise the ordered pairs x·c,y·c and y·c, x·c. The output of the SVM classifier is a ranking function 350 over the cross-product of the feature spaces F and C.

The ranking function 350 is used by the content ranker 130, to rank 340 the content objects 350 available to the user with respect to both their content, and circumstances in which the ranking of the content objects is performed.

Figure 4:
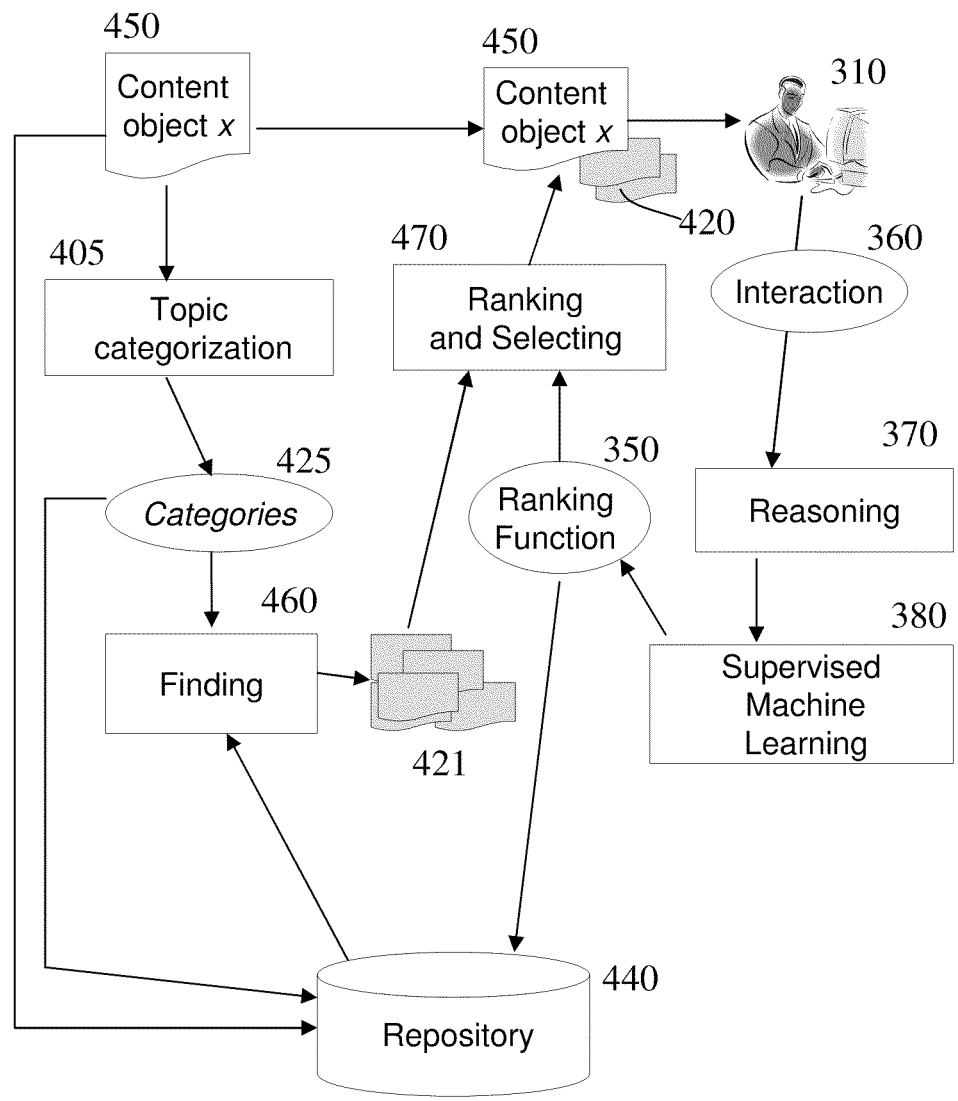
FIG. 4 is a flowchart illustrating a third method for syndicated data stream content provisioning, according to an exemplary embodiment of the present invention.

Reference is now made to FIG. 4, which is a flowchart, illustrating a third method for syndicated data stream content provisioning, according to an exemplary embodiment of the present invention.

Optionally, the content ranker 130 further uses the calculated ranking function 350, to select one or more business objects 420. The business objects are business-value objects, such as advertisements, e-commerce links, etc. The content ranker 130 selects the business objects among business objects stored in a repository 440.

The ranking function 350 is resultant upon behavior reasoning 370 and supervised machine learning 380, applied on data pertaining to the user's 310 interactions 360 with content objects, as described in further detail hereinabove.

The selected business objects 420 match one of the ranked content objects 450. The content ranker 130 may present the selected business objects 420 in association with the matched content object 450, as described in further detail hereinbelow.

Optionally, the selected business objects 420 categorically match the ranked content object 450.

Optionally, the selected business objects 420 (i) match the topical area (say features, as described in further detail hereinabove) of the content object 450, and (ii) are ranked highest among business objects matching the topical area, by the calculated ranking function 350, as described in further detail hereinbelow.

Optionally, the content ranker 130 has access to a collection of business objects (such as advertisements, e-commerce links, etc.).

Optionally, the collection is stored in a local repository 440 locally available to the content ranker 130. Alternatively, the business objects 420 are retrievable (fully or partly), on demand, from a third-party provider repository given a query posed by the content ranker 130, as described in further detail and illustrated using FIG. 5 hereinbelow.

Given a content object denoted x 450, the system first identifies a subset of business objects denoted B(x) 421, which match at least one of the, possibly user-specific, categorical aspects of the content object x 450.

Optionally, the aspects are the features of the feature space F, as described in further detail hereinabove.

In order to identify the subset of business objects B(x) 421, which match the categorical aspects of the content object x 450, the content ranker 130 maintains a, possibly user-specific, set of categories 425.

In a categorizing step 405, the content ranker 130 maps each object (be it a content object x or a business object b) to a subset of the categories o 425. If the object is a priori mapped to the subset of categories o 425, say by the creator of the content, then, the mapping becomes trivial. Otherwise, the content ranker 130 may carry out the mapping, using an automatic content classification system based on a standard supervised learning machinery (such as Naïve Bayes, kNN, or decision tree classifiers), as known in the art.

A business-value object b matches the content object x, if the intersection of their categories denoted Categories(b) and Categories(x), respectively, is not empty. That is to say, b∈B (x) if and only if Categories(b)∩Categories(x)≠∅. Additional conservative requirements on the relation between Categories (b) and Categories(x) are also possible, as known in the art.

Once the subset B(x) 421 is found 460, the content ranker 130 ranks 470 the business objects of the subset B(x) 421, using the ranking function 350, and the content object x 450 is presented to the user, annotated with a subset B*(x)⊆ B(x) 420 the content ranker 130 selects. Optionally, the content ranker 130 present the content object x 450 annotated with a subset B*(x) 420, to the user, say using a dedicated graphical user interface, as described in further detail hereinbelow.

Optionally, the content ranker 130 selects to a number (k) of objects in B(x) 421, where the k business objects 420 are ranked highest by the ranking function 350, thus selecting the objects of B*(x) 420. Alternatively, the content ranker 130 rather selects a random sample of business objects 420 from B(x) 421, to yield B*(x) 420. The selected random sample of business objects 420 may be biased towards the higher values of ranking function 350, or to any other selection procedure, using the ranking function 350, upon application on B(x) 421, as known in the art.

Consequently, if the user decides to access content object x 450, then the content ranker 130 presents the content object x 450 to the user 410, together with indication of the annotated set of business objects B*(x) 420, say using a dedicated graphical user interface, as described in further detail and illustrated using FIG. 8, hereinbelow.

Figure 5:
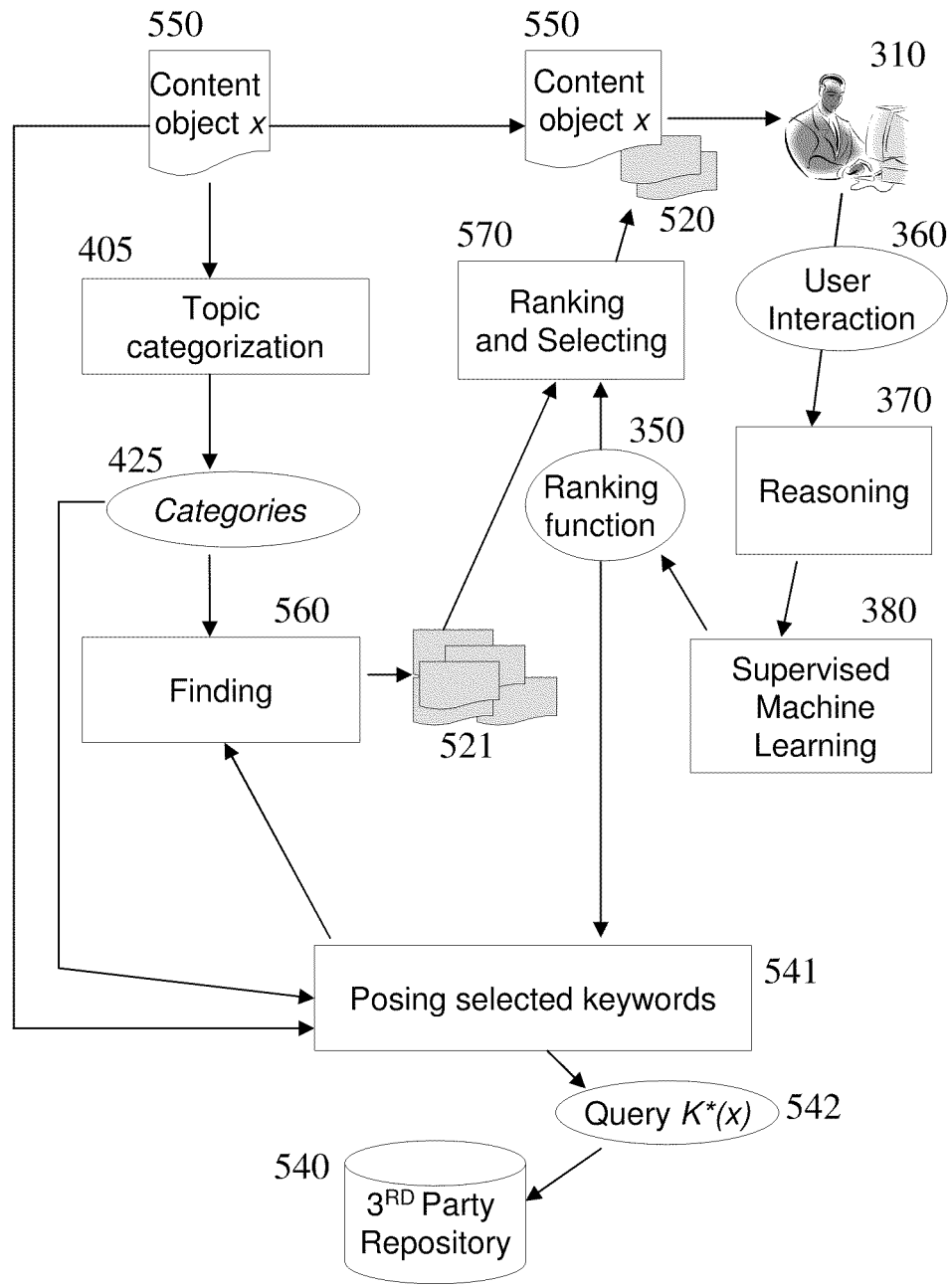
FIG. 5 is a flowchart illustrating a fourth method for syndicated data stream content provisioning, according to an exemplary embodiment of the present invention.

Reference is now made to FIG. 5, which is a flowchart, illustrating a fourth method for syndicated data stream content provisioning, according to an exemplary embodiment of the present invention.

The further methods is also based on the ranking function 350 resultant upon behavior reasoning 370 and supervised machine learning 380, applied on data pertaining to the user's 310 interactions 360 with content objects, as described in further detail hereinabove.

With the fourth method, the collection of business objects is stored in a repository 540 of a third party, rather than an in-house repository. The business objects are available on demand, as a response to a query 542 the content ranker 130 may pose 541, say using the internet.

For finding 560 business objects which match a content item x 550, the content ranker 130 associates the content object x 550 with a subset of keyword combinations K*(x) that purportedly represent the interests of the user 310 within the content of x 550.

Optionally, the keywords are derived from the categories 425 resultant upon topic categorization 405 of the content object 550, as describe in further detail hereinabove.

If K(x) is the set of candidate keyword combinations determined by the content ranker 130, say using a standard lexical analysis of content object x 550, then K*(x)⊆ K(x) is a subset of keyword combinations ranked highest by the user's 310 ranking function 350, when considered as a stand alone content object.

That is to say that for each k∈K*(x) and each k'∈K(x)−K* (x), we have f(k)≥f(k'), where f(k) and f(k') denote values of the ranking function for k and k', respectively. The boundary between K*(x) and K(x)−K*(x) is determined either by a limit on the size of K*(x), or on the basis of the difference of values of the ranking function 350 between the elements of K*(x) and K(x)−K*(x), etc.

The content ranker 130 poses 541 the set of keywords K*(x) extracted for the content object x 550, on the basis of the ranking function 350, in a search query 542, to one or more third-party repositories 540 of business objects.

The content ranker 130 may further formulate the query 542 in a format required by each of the third-party providers.

The content ranker 130 uses business objects 521 provided by the third-party providers in response to the K*(x)-based query, to construct the set of business objects 520, for presentation to the user 310. Optionally, the content ranker 130 selects 570 the subset of business objects among the business objects 521 received, as a response to the query 542, using the ranking function 350, as described in further detail hereinabove.

Finally, the content ranker 130 presents the selected business objects 520 to the user 310, in association with the content object 550, as described in further detail hereinabove.

Figure 6:
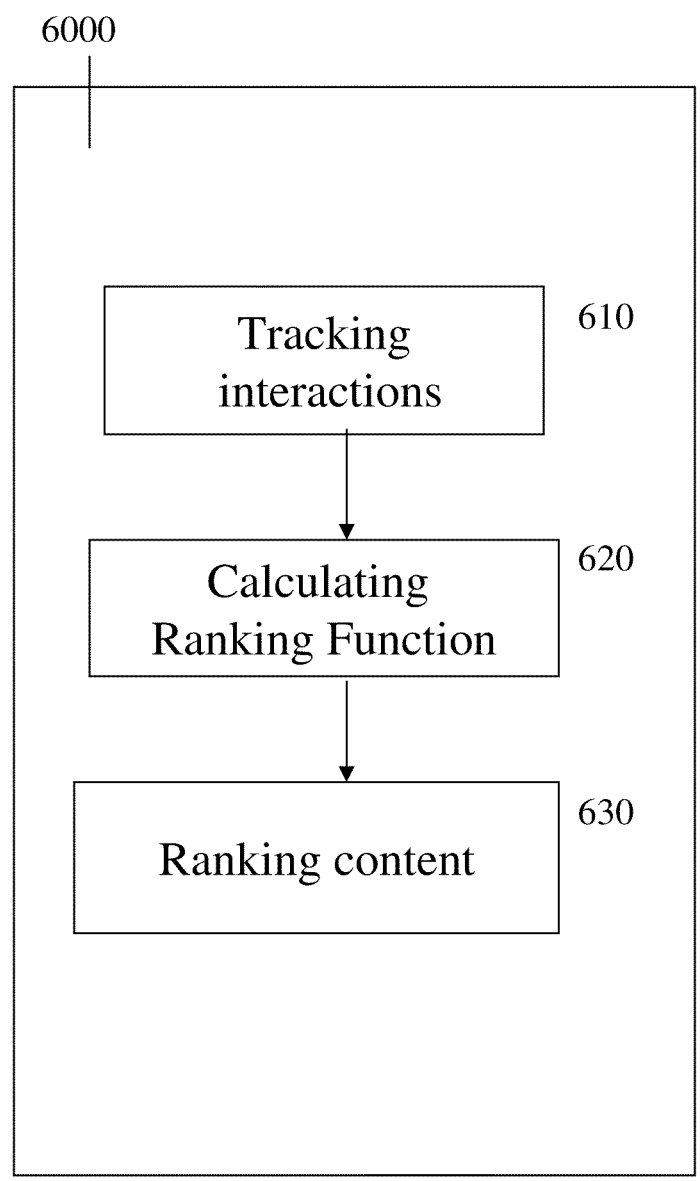
FIG. 6 is a block diagram schematically illustrating a computer readable medium storing computer executable instructions, for performing steps of syndicated data stream content provisioning, according to an exemplary embodiment of the present invention.

Reference is now made to FIG. 6, which is a block diagram schematically illustrating a computer readable medium storing computer executable instructions, for performing steps of syndicated data stream content provisioning, according to an exemplary embodiment of the present invention.

A computer readable medium 6000 such as a CD-ROM, a USB-Memory, a Portable Hard Disk, etc., may store computer executable instructions, performing steps of syndicated data stream content provisioning, according to an exemplary embodiment of the present invention.

Upon execution by a computer, the instructions may track 610 one or more interactions of a user with one or more content objects of one or more syndicated data streams received on a computer device, as described in further detail hereinabove. The tracked interaction is implicitly indicative of a preference of the user.

Then, the instructions calculate 620 a ranking function based on the tracked 610 interaction(s), say using a Ranking Support Vector Machine (SVM) algorithm, as described in further detail hereinabove.

Optionally, the instruction use data pertaining to circumstances of the tracked interaction, for calculating the ranking function. The data pertaining to the circumstances may include, but is not limited to: time of day, day of week, type of a computer device used by the user, bandwidth, geographic location (say geographical location obtained using GPS functionality on the computer device of the user), etc.

Optionally, the instructions further generate comparative data indicative of relative preference of the user over at least two content objects subjected to the traced interactions. For example, the comparative data may indicate that the user prefers a title of a first content object over a title of a second content object. The generated comparative data may be used to calculate the ranking function, as described in further detail hereinbelow.

Finally, the instructions rank 630 content objects of the syndicated data streams, in an order based on the calculated ranking function, as described in further detail hereinabove.

Optionally, the instructions present the ranked 630 content objects to the user in a ranked list arranged in the order determined using the calculated ranking function, as described in further detail hereinabove.

Optionally, the instructions further select one or more business objects among business objects stored in a repository, using the ranking function, as described in further detail hereinabove.

Figure 7:
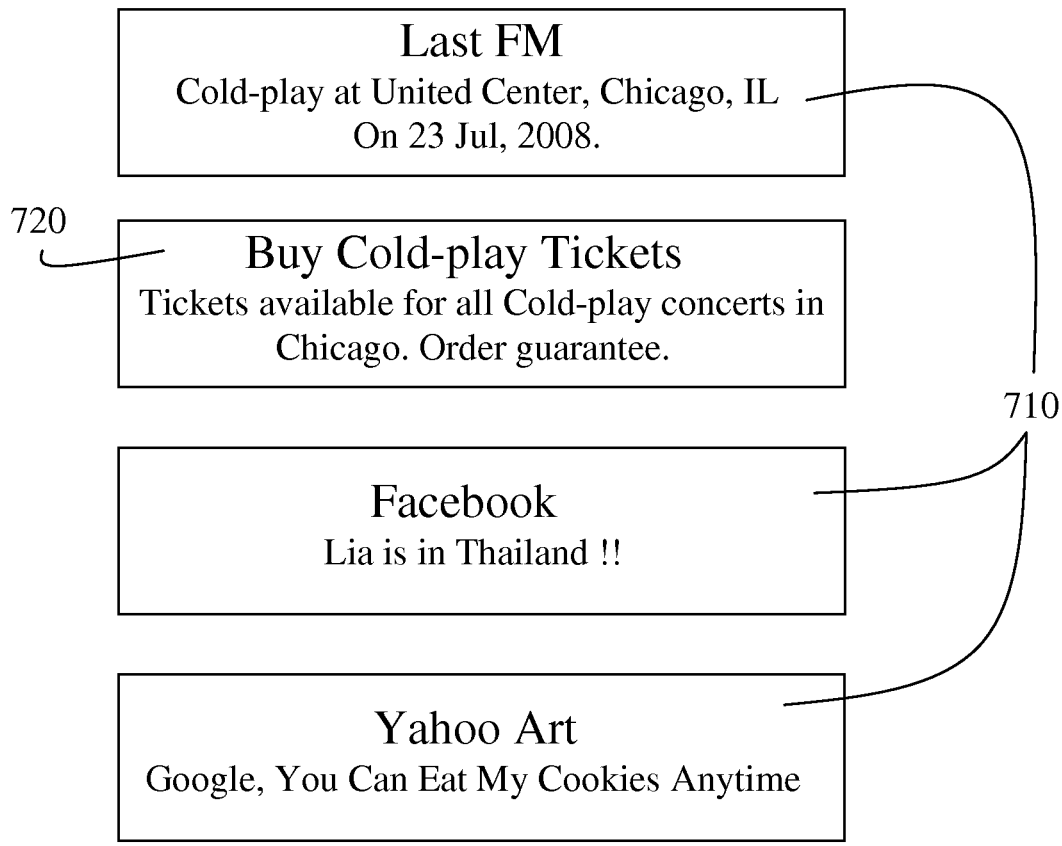
FIG. 7 is a block diagram schematically illustrating a first graphical user interface for syndicated data stream content provisioning, according to an exemplary embodiment of the present invention.

Reference is now made to FIG. 7, which is screenshot illustrating a first graphical user interface for syndicated data stream content provisioning, according to an exemplary embodiment of the present invention.

FIG. 7 illustrates one exemplary graphical user interface, used to present a ranked list of to the user.

According to an exemplary embodiment of the present invention, after the content ranker 130 ranks the content objects of the syndicated data streams, the content ranker may present the ranked content objects 710 to the user, in a ranked list ordered using the calculated ranking function, as describe in further detail hereinabove.

Optionally, the content ranker 130 further uses the calculated ranking function, to select one or more business objects matching one of the ranked content objects, among business objects stored in a repository, as described in further detail hereinabove.

The content ranker 130 may present the selected business objects in association with the matched content object. In one example, the content ranker 130 may present a business object 720 entitled "Buy Cold Play tickets" just below the business object entitled "Last FM, Cold Play at United Center, Chicago, Ill., on 23 Jul. 2008".

Figure 8:
FIG. 8 is a block diagram schematically illustrating a second graphical user interface for syndicated data stream content provisioning, according to an exemplary embodiment of the present invention.

Reference is now made to FIG. 8, which is a screenshot illustrating a second graphical user interface for syndicated data stream content provisioning, according to an exemplary embodiment of the present invention.

FIG. 8 illustrates one exemplary graphical user interface, used to present a ranked list of to the user.

Optionally, the content ranker 130 may rather present the selected business objects in association with the matched content object, when the user clicks on a content object, the user is interested in.

For example, when the user clicks on the content object entitled "Last FM, Cold Play at United Center, Chicago, Ill., on 23 Jul. 2008", in the first place of the ranked list of the screenshot shown in FIG. 7, the user is presented business objects matching the content object clicked on.

One of the matching business objects is a business object 820 used to offer ringtones to the user. The ringtones business object 820 is presented to the user as an annotation to the textual content 810 of the content object clicked on.

It is expected that during the life of this patent many relevant devices and systems will be developed and the scope of the terms herein, particularly of the terms "Computer", "Mobile Computer", "Mobile Phone", "Syndicated Data Stream", "Syndicated Data Feed", "RSS", "Content Object" and "Business Object", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for syndicated data stream content provisioning, the apparatus comprising:

an interaction tracker, configured to track at least one interaction of a specific user with at least one content object of a respective one of a group consisting of at least one syndicated data stream received on a computer device, said interaction being implicitly indicative of a preference of the specific user;

a ranking function calculator, in communication with said interaction tracker, configured to calculate a user specific ranking function, using a multidimensional analysis of content interaction data, the multidimensional analysis being independent of predefined weighting among dimension of the multidimensional analysis, the content interaction data being based on the tracked interaction of the specific user only, the calculation of the user specific ranking function being based on a method independent of any weight assigned to a relationship between the specific user and another specific user, thereby to represent preferences of the specific user; and a content ranker, in communication with said ranking function calculator, configured to rank a plurality of content objects of the syndicated data streams of the group, upon said content objects being received for the specific user, through the syndicated data streams, in an order based on the calculated user specific ranking function wherein said ranking function calculator is further configured to generate comparative data indicative of relative preference of the specific user over at least two of the content objects subjected to the traced interactions, and using the generated comparative data, to calculate the user specific ranking function.

2. The apparatus of claim 1, wherein said content ranker is further configured to present the ranked content objects to the specific user in the order based on the calculated user specific ranking function.

3. The apparatus of claim 1, wherein said content ranker is further configured to present the ranked content objects to the specific user, in a ranked list arranged in the order determined using the calculated ranking function.

4. The apparatus of claim 1, wherein said content ranker is further configured to use the calculated user specific ranking function to select at least one business object among a plurality of business objects.

5. The apparatus of claim 1, wherein said content ranker is further configured to use the calculated user specific ranking function to select at least one business object matching one of the ranked content objects, among a plurality of business objects.

6. The apparatus of claim 1, wherein said content ranker is further configured to use the calculated user specific ranking function to select at least one business object categorically matching one of the ranked content objects, among a plurality of business objects.

7. The apparatus of claim 1, wherein said content ranker is further configured to select at least one keyword among a plurality of keywords characterizing one of the ranked content objects, by applying the calculated user specific ranking function on the keywords, and to select at least one business object among a plurality of business objects, using the selected keywords.

8. The apparatus of claim 1, wherein said content ranker is further configured to select at least one keyword among a plurality of keywords characterizing one of the ranked content objects, by applying the calculated user specific ranking function on the keywords, and to select at least one business object among a plurality of business objects, using a query based on the selected keywords.

9. The apparatus of claim 1, wherein said content ranker is further configured to select at least one keyword among a plurality of keywords characterizing one of the ranked content objects, by applying the calculated user specific ranking function on the keywords, and to select at least one business object among a plurality of business objects of a third party, using the selected keywords.

10. The apparatus of claim 1, further comprising an explicit preference interface, in communication with said ranking function calculator, operable by the user for inputting explicit preference data, wherein said ranking function calculator is further configured to use the input explicit preference data, for calculating the user specific ranking function.

11. The apparatus of claim 1, wherein said ranking function calculator is further configured to use data pertaining to circumstances of the tracked interaction, for calculating the user specific ranking function.

12. The apparatus of claim 1, further comprising a graphical user interface, in communication with said interaction tracker, configured to capture data pertaining the interaction and to provide the captured data to said interaction tracker.

13. The apparatus of claim 1, wherein said ranking function calculator is further configured to generate comparative data indicative of relative preference of the specific user over at least two content objects subjected to the traced interactions.

14. The apparatus of claim 1, wherein said ranking function calculator is further configured to use historical data of interactions of the specific user with content objects, for calculating the user specific ranking function.

15. The apparatus of claim 1, wherein said ranking function calculator is further configured to use a support vector machine (SVM), for calculating the user specific ranking function.

16. The apparatus of claim 1, wherein the traced interactions comprise sharing information pertaining to a content object on a social network platform.

17. The apparatus of claim 1, wherein the traced interactions comprise sharing information pertaining to a content object with a person other than the specific user.

18. The apparatus of claim 1, wherein the computer device is a mobile computer device.

19. The apparatus of claim 1, wherein the computer device is a mobile phone.

20. The apparatus of claim 1, wherein the ranking function calculator is further configured to calculate the user specific ranking function using a multidimensional analysis of the content interaction data, according to multiple circumstantial dimensions comprising at least one time-independent dimension.

21. Computer implemented method for syndicated data stream content provisioning, the method comprising steps the computer is programmed to perform, the steps comprising:
tracking at least one interaction of a specific user with at least one content object of a respective one of a group consisting of at least one syndicated data stream received on a computer device, said interaction being implicitly indicative of a preference of the specific user;
calculating a user specific ranking function, using a multidimensional analysis of content interaction data, the multidimensional analysis being independent of predefined weighting among dimension of the multidimensional analysis, the content interaction data being based on the tracked interaction of the specific user only, said calculating of the user specific ranking function being based on a method independent of any weight assigned to a relationship between the specific user and another specific user, thereby representing preferences of the specific user;
ranking a plurality of content objects of the syndicated data streams of the group, upon said content objects being received for the specific user, through the syndicated data streams, in an order based on the calculated user specific ranking function; and
generating comparative data indicative of relative preference of the specific user over at least two content objects subjected to the traced interactions, and using the generated comparative data, to calculate the user specific ranking function.

22. The method of claim 21, further comprising presenting the ranked content objects to the specific user in the order based on the calculated user specific ranking function.

23. The method of claim 21, further comprising presenting the ranked content objects to the specific user, in a ranked list arranged in the order determined using the calculated user specific ranking function.

24. The method of claim 21, further comprising using the calculated user specific ranking function to select at least one business object among a plurality of business objects.

25. The method of claim 21, further comprising using the calculated user specific ranking function to select at least one business object matching one of the ranked content objects among a plurality of business objects.

26. The method of claim 21, further comprising using the calculated user specific ranking function to select at least one business object categorically matching one of the ranked content objects among a plurality of business objects.

27. The method of claim 21, further comprising selecting at least one keyword among a plurality of keywords characterizing one of the ranked content objects, by applying the calculated user specific ranking function on the keywords, and selecting at least one business object among a plurality of business objects, using the selected keywords.

28. The method of claim 21, further comprising selecting at least one keyword among a plurality of keywords characterizing one of the ranked content objects, by applying the calculated user specific ranking function on the keywords, and selecting at least one business object among a plurality of business objects, using a query based on the selected keywords.

29. The method of claim 21, further comprising selecting at least one keyword among a plurality of keywords characterizing one of the ranked content objects, by applying the calculated user specific ranking function on the keywords, selecting at least one business object among a plurality of business objects of a third party, using the selected keywords.

30. The method of claim 21, further comprising receiving explicit preference data from the specific user, and calculating the user specific ranking function using the received explicit preference data.

31. The method of claim 21, further comprising using data pertaining to circumstances of the tracked interaction, for calculating the user specific ranking function.

32. The method of claim 21, further comprising generating comparative data indicative of relative preference of the specific user over at least two content objects subjected to the traced interactions.

33. The method of claim 21, further comprising using historical data of interactions of the specific user with content objects, for calculating the ranking function.

34. The method of claim 21, further comprising using a support vector machine (SVM), for calculating the user specific ranking function.

35. The method of claim 21, wherein the traced interactions comprise sharing information pertaining to a content object on a social network platform.

36. The method of claim 21, wherein the traced interactions comprise sharing information pertaining to a content object with a person other than the specific user.

37. A non-transitory computer readable medium storing computer executable instructions for performing steps of syndicated data stream content provisioning, the steps comprising:
   tracking at least one interaction of a specific user with at least one content object of a respective one of a group consisting of at least one syndicated data stream received on a computer device, said interaction being implicitly indicative of a preference of the specific user;
   calculating a user specific ranking function, using a multidimensional analysis of content interaction data, the multidimensional analysis being independent of predefined weighting among dimension of the multidimensional analysis, the content interaction data being based on the tracked interaction of the specific user only, said calculating of the user specific ranking function being based on a method independent of any weight assigned to a relationship between the specific user and another specific user, thereby representing preferences of the specific user;
   ranking a plurality of content objects of the syndicated data streams of the group, upon said content objects being received for the specific user, through the syndicated data streams, in an order based on the user specific calculated ranking function; and
   generating comparative data indicative of relative preference of the specific user over at least two content objects subjected to the traced interactions, and using the generated comparative data, to calculate the user specific ranking function.

38. Apparatus for syndicated data stream content provisioning, the apparatus comprising:
   an interaction tracker, configured to track at least one interaction of a specific user with at least one content object of a syndicated data stream received on a computer device, said interaction being implicitly indicative of a preference of the specific user;
   a ranking function calculator, in communication with said interaction tracker, configured to calculate a user specific ranking function, using a multidimensional analysis of content interaction data, the multidimensional analysis being independent of predefined weighting among dimension of the multidimensional analysis, the content interaction data being based on the tracked interaction of the specific user only, the calculation of the user specific ranking function being based on a method independent of any weight assigned to a relationship between the specific user and another specific user, thereby to represent individual preferences of the specific user; and
   a content ranker, in communication with said ranking function calculator, configured to rank a plurality of content objects of syndicated data streams, upon said content objects being received for the specific user, through the syndicated data streams, in an order based on the user specific calculated ranking function
   wherein said ranking function calculator is further configured to generate comparative data indicative of relative preference of the specific user over at least two of the content objects subjected to the traced interactions, and using the generated comparative data, to calculate the user specific ranking function.

* * * * *